US009652826B2

(12) United States Patent
Boisson et al.

(10) Patent No.: US 9,652,826 B2
(45) Date of Patent: May 16, 2017

(54) INTERPOLATION METHOD AND CORRESPONDING DEVICE

(71) Applicant: THOMSON LICENSING, Issy de Moulineaux (FR)

(72) Inventors: Guillaume Boisson, Pleumeleuc (FR); Paul Kerbiriou, Thorigne-Fouillard (FR); David Nebouy, Cesson Sevigne (FR)

(73) Assignee: THOMSON LICENSING, Issy-les-Moulinaeux (FR)

( * ) Notice: Subject to any disclaimer, the term of this patent is extended or adjusted under 35 U.S.C. 154(b) by 0 days.

(21) Appl. No.: 14/762,462

(22) PCT Filed: Jan. 20, 2014

(86) PCT No.: PCT/EP2014/051051
§ 371 (c)(1),
(2) Date: Jul. 21, 2015

(87) PCT Pub. No.: WO2014/114601
PCT Pub. Date: Jul. 31, 2014

(65) Prior Publication Data
US 2015/0356709 A1    Dec. 10, 2015

(30) Foreign Application Priority Data

Jan. 24, 2013    (FR) ..................... 13 50627

(51) Int. Cl.
*G06K 9/32*    (2006.01)
*G06T 3/40*    (2006.01)
*H04N 13/00*   (2006.01)

(52) U.S. Cl.
CPC .......... *G06T 3/4007* (2013.01); *G06T 3/4053* (2013.01); *H04N 13/0022* (2013.01); *H04N 13/0037* (2013.01)

(58) Field of Classification Search
CPC ................ H04N 19/182; H04N 19/176; G06T 2207/20228; G06T 2207/20021; G06T 3/4007
See application file for complete search history.

(56) References Cited

U.S. PATENT DOCUMENTS 5,583,794 A * 12/1996 Shimizu ................. H04N 19/00
348/391.1
5,875,268 A *  2/1999 Miyake ................... G06T 3/403
382/269

(Continued)

FOREIGN PATENT DOCUMENTS

EP    0574245    12/1993
EP    0696017     2/1996

(Continued)

OTHER PUBLICATIONS

Sizintsev et al.; "Effieient stereo with accurate 3-D boundaries"; Proceedings of the British Machine Vision Conference; Sep. 2006; pp. 1-10.*

(Continued)

Primary Examiner — Eueng-Nan Yeh
(74) Attorney, Agent, or Firm — Tutunjian & Bitetto, P.C.

(57) ABSTRACT

A method for estimating occlusion in a virtual environment comprising at least two objects and observed from a viewpoint. Thereafter, a second item of information representative of the distance separating a second fragment of a second object from the viewpoint according to an observation direction is computed; the second item of information is compared with a first item of information representative of the distance separating a first fragment of a first object from the viewpoint according to the observation direction and is stored in a first buffer memory. If the second item of information is less than the first item of information, then a third item of information representative of attributes asso- (Continued)

ciated with the second fragment is estimated, the second item of information is stored in a second buffer memory and of the third item of information is stored in a third buffer memory. If the second item of information is greater than the first item of information, then the first item of information is stored in the second buffer memory.

18 Claims, 4 Drawing Sheets

(56) References Cited

U.S. PATENT DOCUMENTS

| | | | |
|---|---|---|---|
| 6,078,331 A * | 6/2000 | Pulli | G06T 17/20 345/423 |
| 2008/0055338 A1 * | 3/2008 | Wei | G06T 3/403 345/667 |
| 2009/0179920 A1 | 7/2009 | Riemens et al. | |
| 2011/0032269 A1 | 2/2011 | Lukac et al. | |
| 2011/0274371 A1 * | 11/2011 | Hsieh | G06T 3/4007 382/300 |

FOREIGN PATENT DOCUMENTS

| | | |
|---|---|---|
| EP | 0706154 | 4/1996 |
| WO | WO9016035 | 12/1990 |

OTHER PUBLICATIONS

Dierickx etal:"Missing Pixel Correction Algorithm for Image Sensors"; Proceedings of SPIE_International Society for Optical Engineering, US, vol. 3410, May 19, 1998, (May 19, 1998), p. 200-203.

Smith : "Bilinear Interpolation of Digital Images", Ultramicroscopy, vol. 6, N° 2, Jan. 1, 1981 (Jan. 1, 1981), p. 201-204.

Tanbakuchi: "Adaptive Pixel Defect Correction"; Proceedings of SPIE; US; May 14, 2003 (May 14, 2003), p. 360-370.

wikipedia.org: wiki; "Bilinear filtering"; Jun. 30, 2015; pp. 1-4.

Shi et al: "Context based adaptive image resolution upconversion"; Journal of electronic imaging; Jan.-Mar. 2010; vol. 19(1); pp. 013008-1 to 013008-9.

Turgay et al: "Directionally adaptive super resolution"; Proceedings of the 2009 16th IEEE International Conference on Image Processing (ICIP 2009); oages 1291-1204.

Hu et al: "Depth Map Super-Resolution Using Synthesized View Matching for Depth-Image-Based Rendering"; 2012 IEEE International Conference on Multimedia & Expo Workshops (ICMEW 2012); pp. 606-610.

Search Report Dated Mar. 13, 2014.

\* cited by examiner

INTERPOLATION METHOD AND CORRESPONDING DEVICE

This application claims the benefit, under 35 U.S.C. §365 of International Application PCT/EP2014/051051, filed Jan. 20, 2014, which was published in accordance with PCT Article 21(2) on Jul. 31, 2014 in English and which claims the benefit of French patent application No. 1350627 filed Jan. 24, 2013.

FIELD OF THE INVENTION

The invention relates to the field of image or video processing. The invention also relates to the field of interpolation of pixel blocks and more specifically to the upsampling of a source pixel block or matrix.

PRIOR ART

According to the prior art, devices exist which make it possible to capture various information to be associated with the pixels of an image, such as for example the grey levels or disparity information between several views of a same scene, that is to say between several images of a same scene captured according to several viewpoints. The grey level information is for example captured using CCD sensors of a still camera or of a video camera and the inter-view disparity information is for example captured using a depth sensor (for example of Kinect® type) or calculated using disparity estimation software. This information is stored in the maps associated with the images, for example a grey level map corresponding to a pixel matrix comprising as many pixels as the image with which it is associated, a grey level value being associated with each pixel, or a disparity map corresponding to a pixel matrix comprising as many pixels as the image with which it is associated, a disparity value being associated with each pixel.

Capture or estimation errors during the capture or estimation of this information cause holes to appear in the maps associated with the images, that is to say certain pixels have no associated (grey level or disparity) information or have erroneous associated information.

Moreover, the maps sometimes have limited resolutions due to hardware limitations intrinsic to the sensors used for capturing this information or due to real-time capture constraints which prevent high-resolution capture.

SUMMARY OF THE INVENTION

The purpose of the invention is to overcome at least one of these disadvantages of the prior art.

More specifically, the purpose of the invention is notably to provide an information map associated with a complete image and/or a better resolution.

The invention relates to a method of interpolating a first block of pixels into a second block of pixels, the second block comprising a number of pixels greater than the number of pixels of the first block, the first block of pixels comprising four pixels arranged in two adjacent rows and two adjacent columns, first values being associated with the pixels of the first block, the first values being determinate for three of the four pixels and indeterminate for one of the four pixels. The method comprises determining second values to be associated with at least a part of interpolated pixels of the second block from the three pixels of the first block having associated first values determined from coordinates of said three pixels in the first block, from first values associated with said three pixels and from coordinates of interpolated pixels in the second block.

According to a particular characteristic, the method further comprises comprising determining an equation of a plane passing through the three pixels of the first block having associated first values determined from the coordinates of the three pixels in the first block and the first values associated with the three pixels, the second values to be associated with the at least a part of the interpolated pixels being determined from the equation of the plane and the coordinates of the interpolated pixels in the second block.

Advantageously, at least a part of the determined second values are associated with interpolated pixels positioned outside a polygon having as vertices the three pixels of the first block copied into the second block.

Advantageously, indeterminate first value is associated with at least one pixel of the second block.

According to another characteristic, the number of pixels of the second block with which are associated the indeterminate first value is a function of the parity of at least one of the horizontal and vertical upsampling factors used to obtain the second block of pixels by interpolation of the first block of pixels.

According to a specific characteristic, the second block corresponds to an upsampling of the first block by using a horizontal upsampling factor and a vertical upsampling factor; the method further comprises the steps of:
  determining the parity of said horizontal and vertical upsampling factors,
  determining an interpolation rule to be applied to the interpolated pixels (203, 228) belonging to the middle column of the second block when the horizontal upsampling factors is even and/or to be applied to the interpolated pixels belonging to the middle row of the second block when the vertical upsampling factor is even.

Advantageously, the interpolation rule is chosen from among a set of rules comprising the following rules:
  association of second values with the pixels of the middle column and/or the middle row determined from the equation of the plane;
  association of second values with the pixels of the middle column and/or the middle row corresponding to at least one first value associated with at least one pixel of the first block.

According to another characteristic, the first values are values representative of disparity.

According to a particular characteristic, the first values are values representative of grey level.

The invention also relates to a module for interpolating a first block of pixels into a second block of pixels, the second block comprising a number of pixels greater than the number of pixels of the first block, the first block of pixels comprising four pixels arranged in two adjacent rows and two adjacent columns, first values being associated with the pixels of the first block, the first values being determinate for three of the four pixels and indeterminate for one of the four pixels, the module comprising at least one processor configured for determining second values to be associated with at least a part of interpolated pixels of the second block from the three pixels of the first block having associated first values determined from coordinates of said three pixels in the first block, from first values associated with said three pixels and from coordinates of interpolated pixels in the second block.

According to a specific characteristic, the at least one processor is a graphics processing unit (GPU).

Advantageously, the at least one processor is further configured for determining an equation of a plane passing through the three pixels of the first block having associated first values determined from the coordinates of the three pixels in the first block and the first values associated with the three pixels, the second values to be associated with the at least a part of the interpolated pixels being determined from the equation of the plane and the coordinates of the interpolated pixels in the second block.

The invention also relates to a computer program product comprising program code instructions for executing the steps of the interpolation method, when this program is executed on a computer.

LIST OF FIGURES

The invention will be better understood, and other specific features and advantages will emerge upon reading the following description, the description making reference to the annexed drawings wherein.

DETAILED DESCRIPTION OF EMBODIMENTS OF THE INVENTION

Figure 1:
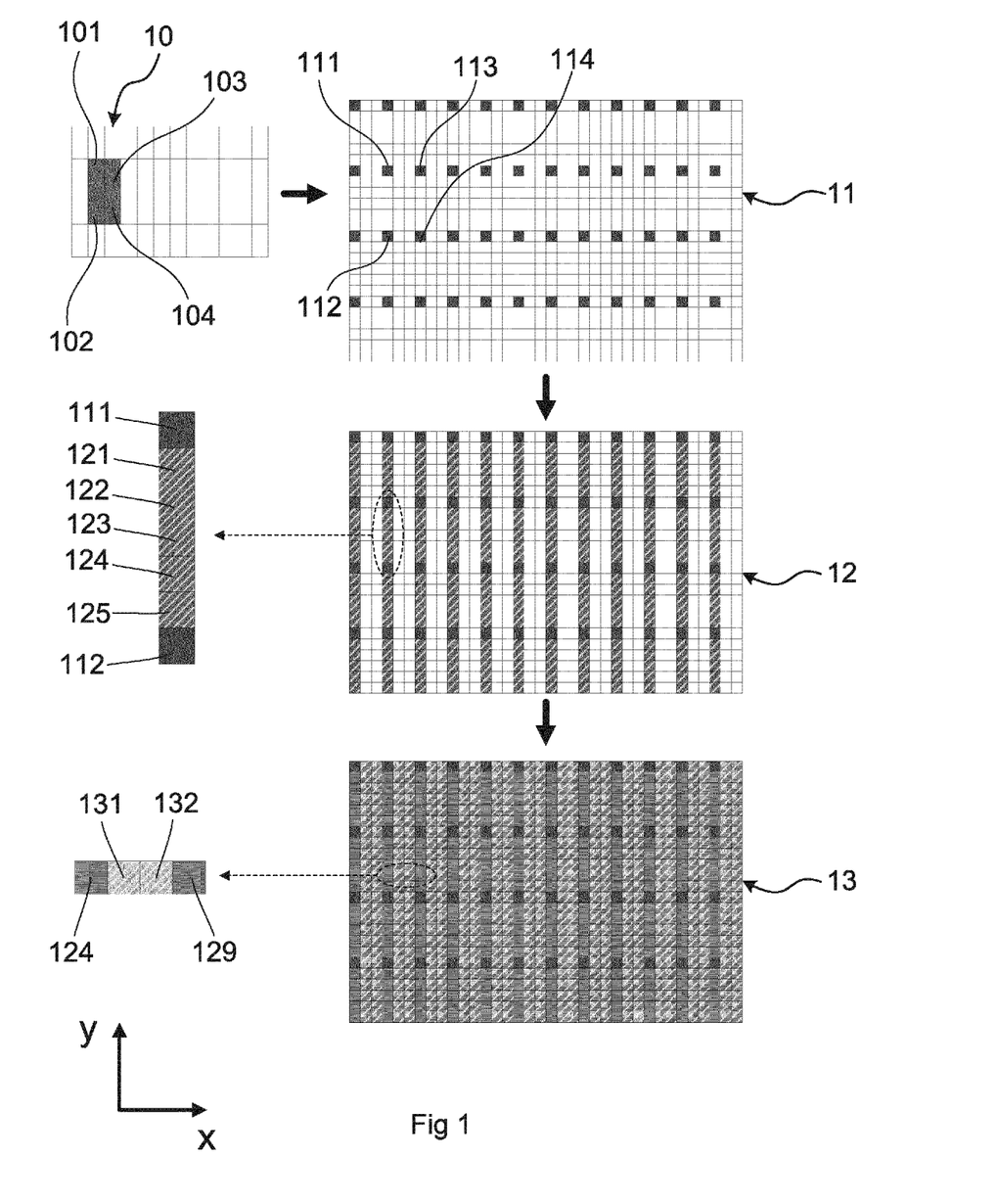
FIG. 1 shows the generation of a second pixel matrix from a first pixel matrix, according to a particular embodiment of the invention.

FIG. 1 shows the generation of a second pixel matrix 13 (also called second pixel block) by interpolation of a first pixel matrix 10 (also called first pixel block), according to a particular and non-restrictive embodiment of the invention. The second pixel matrix 13 advantageously comprises more pixels than the first pixel matrix 10. In other words, the resolution of the second pixel matrix 13 is greater than the resolution of the first pixel matrix 10. According to a first example, the resolution of the first pixel matrix 10 is 640*360 pixels (that is to say 640 columns and 360 rows) and the resolution of the second pixel matrix 13 is 1920*1080 (that is to say 1920 columns and 1080 rows). According to this first example, the horizontal upsampling factor N for going from the first matrix 10 to the second matrix 13 is N=3 and the vertical upsampling factor M for going from the first matrix 10 to the second matrix 13 is M=3. According to this first example, the horizontal and vertical upsampling factors are equal. According to a second example, the resolution of the first pixel matrix 10 is 640*360 pixels in interlaced mode and the resolution of the second pixel matrix 13 is 1920*1080. According to this second example, the horizontal upsampling factor N and vertical upsampling factor M are different, M being equal to 6 and N being equal to 3. Naturally, the resolutions of the first and second matrices are not limited to these two examples but extend to any resolution (for example 1024*768 pixels for the first matrix 10 and 2048*1536 for the second matrix 13 with upsampling factors M and N equal to 2 or 1024*720 for the first matrix 10 and 4096*2160 for the second matrix 13 with a horizontal upsampling factor N=4 and a vertical upsampling factor M=3). According to the different examples, the upsampling factors can be either even or odd.

With each pixel of the first pixel matrix 10 is associated a value, the value being for example representative of disparity or representative of grey level. The first matrix advantageously corresponds to a disparity map associated with an image when the values associated with the pixels of the first matrix 10 are representative of disparity. In stereoscopy (that is to say when several images represent a same scene according to several viewpoints, for example two images (left and right) of a same scene), a disparity map associated with a first image (for example a left image) comprises the horizontal difference in pixels between a pixel of the first image (for example the left image) and the corresponding pixel of the second image (for example the right image), two corresponding pixels of the first image and the second image representing the same element of the scene. The disparity values associated with the pixels of an image are for example captured by a suitable device. According to a variant, the disparity values are estimated by comparing two images of a same scene, that is to say by matching each pixel of a first image of the scene with a corresponding pixel of the second image of the same scene (two corresponding pixels of the first image and the second image representing the same element of the scene, that is to say that a same grey level value (within a margin of error) is associated with two corresponding pixels) and by determining the difference in horizontal position between the pixel of the first image and the corresponding pixel of the second image (expressed in number of pixels). When the measurement or the estimation of the disparity associated with one or more pixels of the disparity map is erroneous (for example when an object is visible from one viewpoint and occulted from another viewpoint), the disparity value stored for these pixels in the first pixel matrix is indeterminate or unknown. An indeterminate or unknown value is for example identified via a predetermined code, for example a code equal to 1111111 (0xFF in hexadecimal) when the disparity value is coded on 8 bits or 11111111111 (0x07FF in hexadecimal) when the disparity value is coded on 11 bits.

The first matrix 10 advantageously corresponds to a grey level map associated with an image when the values associated with the pixels of the first matrix 10 are representative of grey levels. The values representative of grey level are for example coded on 8, 10 or 12 bits, a grey level for each colour channel of the image for example being available, that is to say that a grey level map is associated with each colour channel (for example RGB). When the grey level value or values associated with one or more pixels of the first pixel matrix is or are erroneous (for example following a sensor measurement problem), the grey level value stored for this or these pixels in the first pixel matrix is indeterminate or unknown. An indeterminate or unknown value is for example identified via a predetermined code, for example a code equal to 11111111 or 00000000 when the disparity value is coded on 8 bits.

The rest of the description of FIG. 1 will be based on the example according to which the resolution of the first pixel matrix 10 is 640*360 pixels in interlaced mode and the resolution of the second pixel matrix 13 is 1920*1080 pixels in progressive mode, that is to say that the horizontal upsampling factor N is equal to 3 and the vertical upsampling factor M is equal to 6. The position of each pixel of the first and second matrices is defined by the column number C/row number L pair corresponding to the coordinates of the pixel in the pixel matrix, the position of a pixel of the first matrix being defined by the pair ($C_1$; $L_1$) and the position of a pixel of the second matrix being defined by the pair ($C_2$; $L_2$). The second pixel matrix 13 is for example obtained by bilinear interpolation of the first pixel matrix 10. During a first step, each pixel of the first matrix 10 is copied into a first intermediary version 11 of the second matrix at a position which depends on the position of the pixel in the first matrix 10, the horizontal upsampling factor N and the vertical upsampling factor M. The position of a pixel of the first matrix 10 copied into the first intermediary version 11 of the second matrix 13 is obtained by the following equations:

$$C_2 = N*C_1$$

$$L_2 = M*C_1$$

By taking as examples the 4 adjacent pixels 101, 102, 103 and 104 appearing in grey on the first matrix 10 and having respectively the following coordinates expressed in column number $C_1$ and row number $L_1$ (1; 1), (1; 2), (2; 1) and (2; 2), the first row and the first column of a matrix being numbered 0, the coordinates of the 4 pixels 111, 112, 113 and 114 of the first version 11 of the second matrix corresponding respectively to the 4 pixels 101, 102, 103 and 104 of the first matrix 10 are respectively (3; 6), (3; 12), (6; 6) and (6; 12). By copying a pixel of the first matrix into the second matrix is understood the assignation of the value associated with the pixel of the first matrix to the corresponding pixel of the second matrix. This operation is advantageously repeated for each pixel of the first matrix 10 which has a corresponding pixel (that is to say with a same associated value) in the second matrix. In order to determine the values to be associated with the remaining pixels of the second matrix (identified in white in the first intermediary version 11 of the second matrix), the bilinear interpolation method known by those skilled in the art is used. According to this method, the values of the pixels belonging to the columns of the second matrix for which values are associated with at least some pixels are determined by interpolation by using the values of the pixels surrounding the pixels for which no value is associated. These pixels of the columns for which the value to be associated are determined by interpolation are identified in grey with white hatches on the second intermediary version 12 of the second matrix. As an example, a part of the second intermediary version 12 of the second matrix is enlarged for greater legibility. The enlarged part is surrounded by a dashed oval and corresponds to a part of column number 3 which comprises pixels 111, 121, 122, 123, 124, 125 and 112. Pixels 111 and 112 correspond to pixels 101 and 102 of the first matrix 10, that is to say the value associated with each of these pixels 111 and 112 is a copy of the value associated respectively with pixels 101 and 102. The values associated with pixels 121 to 125 are determined by interpolation of the values associated with pixels 111 and 112, pixels 111 and 112 surrounding pixels 121 to 125. Then the values of the remaining pixels (identified in white on the second intermediary version 12 of the second pixel matrix) are determined row by row by using the values of the pixels of a row surrounding the pixels for which the associated values are determined. This is shown by the second pixel matrix 13 where the pixels of the rows for which the associated values have been determined appear in grey with white hatches. As an example, a part of the second matrix 13 is enlarged for greater legibility. The enlarged part is surrounded by a dashed oval and corresponds to a part of row 10 which comprises pixels 124, 131, 132 and 129, the values associated with pixels 124 and 129 having been determined previously by interpolations of values from the first matrix 10. The values associated with pixels 131 and 132 are determined by interpolation of the values associated with pixels 124 and 129, pixels 124 and 129 surrounding pixels 131 and 132. Naturally, it is possible to determine firstly the rows of the second matrix comprising pixels having an associated value from the first matrix then secondly the columns for the remaining pixels. According to this bilinear interpolation method, interpolation coefficients are used to weight the values associated with the pixels surrounding the pixels for which the values to be associated are to be determined. These interpolation coefficients are advantageously determined for each pixel whose value is to be determined as a function of the vertical upsampling factor M for the pixels of the columns (as indicated on the second intermediary version 12 of the second matrix for the pixels appearing in grey with white hatches, for example pixels 121 to 125) and as a function of the horizontal upsampling factor N for the pixels of the rows (as indicated on the second matrix 13 for the pixels appearing in grey with white hatches, for example pixels 131 and 132). For each pixel whose associated value is determined by interpolation of the two values of the pixels surrounding this pixel, two interpolation factors are used, a first factor ($\alpha\_y$) to weight the first of the two pixels surrounding the pixel to be determined and a second factor ($\beta\_y$) to weight the second of the two pixels surrounding the pixel to be determined). The first and second vertical weighting factors (that is to say used to determine the values associated with the pixels of a column from pixels of this column for which the associated values are known, for example to determine the values associated with pixels 121 to 125 from pixels 111 and 112) are calculated from the following equations:

$$\alpha\_y = k/M$$

$$\beta\_y = 1 - \alpha\_y$$

where k is comprised between 1 and M−1, k being equal to M−1 for the pixel nearest to the first pixel surrounding the pixel to be determined and 1 for the pixel the furthest from the first pixel surrounding the pixel to be determined, k being decremented by 1 as one moves away from the first pixel surrounding the pixel to be determined and as one approaches the second pixel surrounding the pixel to be determined. By taking the example of pixels 121 to 125 whose associated values are determined from the values of pixels 111 and 112 and by considering that pixel 111 is the first pixel surrounding pixels 121 to 125 and pixel 112 is the second pixel surrounding pixels 121 and 125, the values of the first and second vertical interpolation factors applied to pixels 121 to 125 are respectively:

|  | Pixel 121 | Pixel 122 | Pixel 123 | Pixel 124 | Pixel 125 |
| --- | --- | --- | --- | --- | --- |
| $\alpha\_y$ | 5/6 | 4/6 | 3/6 | 2/6 | 1/6 |
| $\beta\_y$ | 1/6 | 2/6 | 3/6 | 4/6 | 5/6 |

Thus, the value V to be associated with one of pixels 121 to 125 is the average of the sum of the values associated with the first and second pixels 111 and 112 surrounding pixels 121 to 125 weighted by the vertical interpolation factors, namely:

$$V_{pixel} = (\alpha\_y * V_{Pixel,111} + \beta\_y * V_{Pixel,112})$$

Where $V_{pixel}$ is the value to be associated with the pixel whose associated value we seek to determine, $V_{pixel,111}$ is the value associated with the first pixel surrounding the pixel whose associated value we seek to determine and $V_{pixel,112}$ is the value associated with the second pixel surrounding the pixel whose associated value we seek to determine.
Applied to pixels 121 to 125, this gives:

$$V_{121}=(5/6*V_{Pixel,111}+1/6*V_{Pixel,112})$$

$$V_{122}=(4/6*V_{Pixel,111}+2/6*V_{Pixel,112})$$

$$V_{123}=(3/6*V_{Pixel,111}+3/6*V_{Pixel,112})$$

$$V_{124}=(2/6*V_{Pixel,111}+4/6*V_{Pixel,112})$$

$$V_{125}=(1/6*V_{Pixel,111}+5/6*V_{Pixel,112})$$

In the same way, horizontal interpolation factors are used to determine the values to be associated with pixels of a row from the values of two pixels surrounding these pixels on the row considered for which the associated values are known (either copied from the first matrix or determined by interpolation applied to a column as explained previously). These first and second horizontal interpolation factors (denoted respectively by $\alpha\_x$ and $\beta\_x$) are advantageously determined as a function of the horizontal upsampling factor N, namely:

$$\alpha\_x=k/N$$

$$\beta\_x=1-\alpha\_x$$

where k is comprised between 1 and N−1, k being equal to N−1 for the pixel nearest to the first pixel surrounding the pixel to be determined and 1 for the pixel the furthest from the first pixel surrounding the pixel to be determined, k being decremented by 1 as one moves away from the first pixel surrounding the pixel to be determined and as one approaches the second pixel surrounding the pixel to be determined. By taking the example of pixels 131 and 132 whose associated values are determined from the values of pixels 124 and 129 and by considering that pixel 124 is the first pixel surrounding pixels 131 and 132 and pixel 125 is the second pixel surrounding pixels 131 and 132, the values of the first and second horizontal interpolation factors applied to pixels 131 and 132 are respectively:

|  | Pixel 131 | Pixel 132 |
| --- | --- | --- |
| $\alpha\_x$ | 2/3 | 1/3 |
| $\beta\_x$ | 1/3 | 2/3 |

Thus, the value V to be associated with one of pixels 131 and 132 is the average of the sum of the values associated with the first and second pixels 124 and 129 surrounding pixels 131 and 132 weighted by the vertical interpolation factors, namely:

$$V_{pixel}=(\alpha\_x*V_{Pixel,124}+\beta\_x*V_{Pixel,129})$$

Where $V_{pixel}$ is the value to be associated with the pixel whose associated value we seek to determine, $V_{pixel,124}$ is the value associated with the first pixel surrounding the pixel whose associated value we seek to determine and $V_{pixel,129}$ is the value associated with the second pixel surrounding the pixel whose associated value we seek to determine.
Applied to pixels 131 and 132, this gives:

$$V_{131}=(2/3*V_{Pixel,124}+1/3*V_{Pixel,129})$$

$$V_{132}=(1/3*V_{Pixel,124}+2/3*V_{Pixel,129})$$

The bilinear interpolation method is advantageously used to determine the values of the pixels for which the associated value is not known when the values associated with the pixels surrounding the pixels whose associated value we seek to determine are known and/or have no significant variation from one pixel to another. For example, if the value associated with one or more pixels 101 to 104 of the first matrix 10 is not known, the bilinear interpolation method will not be used to determine the pixels of the second matrix 13 surrounded by the 4 pixels 111 to 114 of the second matrix 13 and corresponding to the 4 pixels 101 to 104 of the first matrix 10. In the same way, if a difference between two adjacent pixels from among the 4 pixels 101 to 104 of the first matrix 10 occurs (that is to say if the difference between the values associated with the two adjacent pixels is greater than a determined threshold value, which means in practice that these 2 considered adjacent pixels belong to 2 different objects on the image associated with the first matrix 10), the bilinear interpolation method will not be used to determine the pixels of the second matrix 13 surrounded by the 4 pixels 111 to 114 of the second matrix 13 corresponding to the 4 pixels 101 to 104 of the first matrix 10. When one or other of these cases occurs, the method described with regard to FIG. 2 will advantageously be used in order to minimise the interpolation errors.

Figure 2:
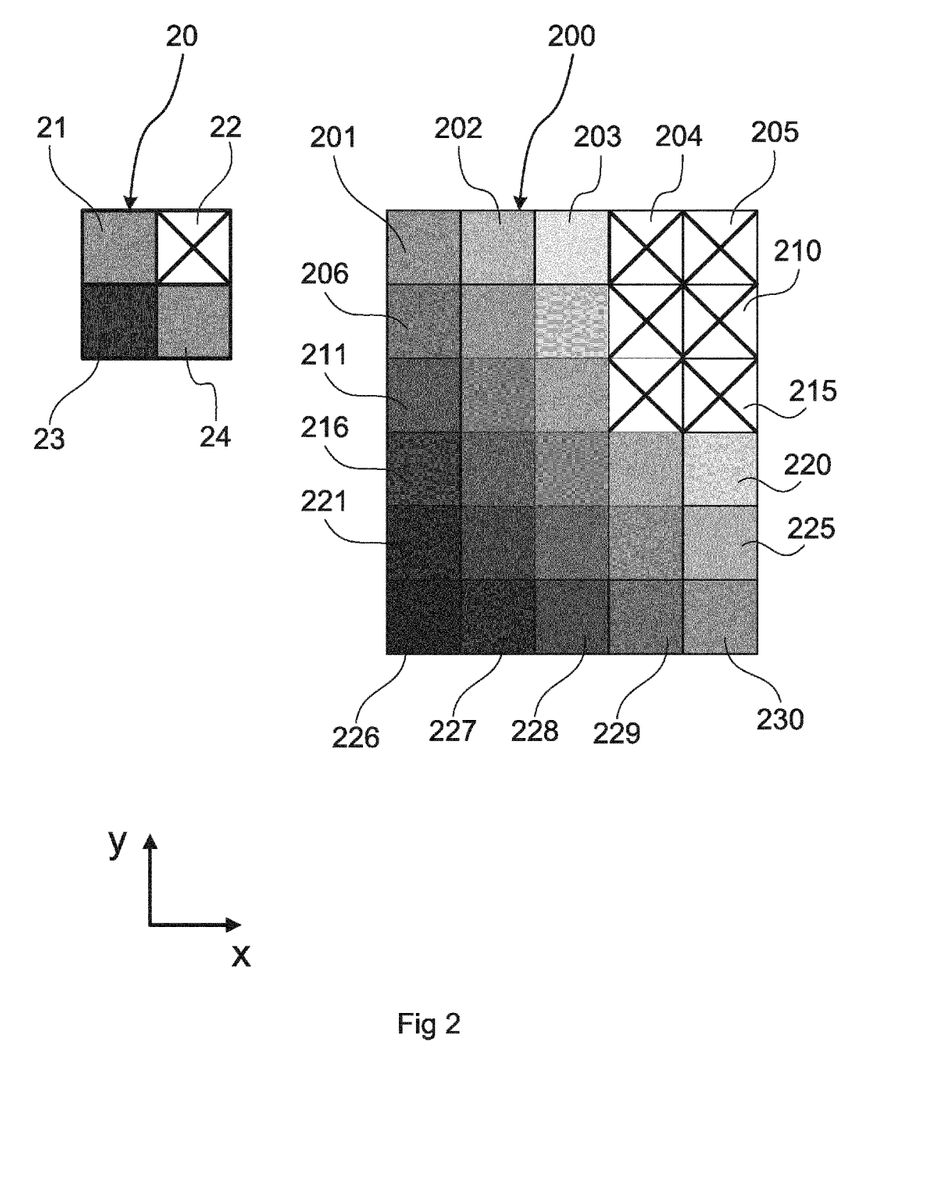
FIG. 2 shows the interpolation of a group of pixels of the first pixel matrix of FIG. 1 to a second group of pixels, according to a particular implementation of the invention.

FIG. 2 shows the interpolation of a first group of pixels 21, 22, 23 and 24 (called first block of pixels) to a second group of pixels 201 to 230 (called second block of pixels), according to a particular and advantageous embodiment of the invention. The first block of pixels 21 to 24 corresponds for example to a block of pixels of the first pixel matrix 10 or to a first pixel matrix 20 comprising only 4 pixels. According to the non-restrictive example of FIG. 2, the horizontal upsampling factor N is equal to 4 and the vertical upsampling factor M is equal to 5. The values associated with pixels 21, 23 and 24 are known (either via measurements carried out by one or more suitable sensors or via any estimation method known to those skilled in the art). The three pixels 21, 23 and 24 are adjacent and are distributed over two adjacent columns and over two adjacent rows. According to a first example, the value associated with the fourth pixel 22 is unknown or representative of a capture or estimation error. According to a second example, the difference between the value associated with this pixel 22 and the value associated with the adjacent pixel 21 of the same row or the difference between the value associated with this pixel 22 and the value associated with the adjacent pixel 24 of the same column is greater than a threshold value. A difference in values greater than a threshold value is representative of this pixel 22 on one hand and pixels 21, 23 and 24 on the other hand belonging to two different objects of the image associated with the first block 10. For example, if the values associated with pixels 21 to 24 are representative of disparities, a significant difference in disparity between two pixels (that is to say greater than a threshold value, for example greater than 10 or 15 pixels) signifies that the objects to which belong these pixels 22 on one hand and 21, 23 and 24 on the other hand belong to different depth planes. In the same way, if the values associated with pixels 21 to 24 are representative of grey level, a significant difference in grey level (that is to say greater than a threshold value, for example greater than 16 or 32 when the grey levels are coded on 8 bits, that is to say on a scale of 0 to 255) reveals the presence of a contour at pixels 21 to 24, that is to say that pixel 22 on one hand and pixels 21, 23 and 24 on the other hand belong to different objects of the image. To overcome the problems of interpolation which would be based on the 4 values associated with the 4 pixels 21 to 24 in the case of upsampling of the 4 pixels of the first block 20 to generate a second block 200, the values associated with pixels 21, 23 and 24 are copied and associated with the corresponding pixels of the second block 200, that is to say associated respectively with pixels 201, 226 and 230. The unknown value (or the value having a difference greater than the threshold value with respect to one of the values associated with pixels 21 and 24) associated with pixel 22 is also copied and associated with pixel 205 of the second block 200 corresponding to pixel 22 of the first block 20. As explained with regard to FIG. 1, the coordinates in the X,Y reference system (that is to say the row and column numbers) of pixels 201, 205, 226 and 230 of the second block 200 corresponding respectively to pixels 21, 22, 23 and 24 are determined from the coordinates of pixels 21, 22, 23 and 24 in the first block 20 and from the upsampling factors M and N. The coordinates of pixels 21, 22, 23 and 24 are thus for example respectively (0,0), (1,0), (0,1) and (1,1) in the first block 20 and the coordinates of the corresponding pixels 201, 205, 226 and 230 are respectively (0,0), (4,0), (0,5) and (4,5) in the second block 200. In order to determine the values to be associated with the other pixels 202, 203, 204, 206 to 210, 211 to 215, 216 to 220, 221 to 225, 227, 228 and 229, the equation of the plane passing through the three pixels (of the first block 20 or equivalently of the second block 200, pixels 21 to 24 of the first block being copied into the second block) whose associated values are known is determined. The Cartesian equation of the plane has the form:

$$a*x+b*y+c*z+d=0$$

where x and y correspond to the coordinates of the pixels of the plane (that is to say respectively the column number and the row number of a pixel of the plane); z corresponds to the value associated with a pixel of the plane; a, b, c and d correspond to the factors of the plane which it is possible to determine by knowing 3 pixels of the plane.

Once the equation of the plane is determined (that is to say once the values of the factors a, b, c and d are determined) according to any method known to those skilled in the art from the three pixels for which x, y and z are known, it is possible to find the value to be associated with the pixels for which the value is sought by knowing their coordinates x and y (that is to say the column and row numbers) in the second block 200, $z_{pixel}$ corresponding to the value to be associated with a pixel whose associated value is sought (knowing the column number of the pixel $x_{pixel}$ and the row number of the pixel $y_{pixel}$). We thus have:

$$z_{pixel}=-(a*x_{pixel}+b*y_{pixel}+d)/c$$

From this equation and knowing the coordinates x and y of the pixels whose associated values we want to determine, it is possible to determine z (the associated value) for each pixel of the second block 200, that is to say for each pixel of the area delimited by the 4 pixels 201, 205, 226 and 230 for which the associated values are known via the first block 20. It is thus possible to determine the values associated with the pixels situated inside the triangle having as vertices the three points used to determine the equation of the plane, that is to say the pixels 201, 226 and 230, but also to determine the values associated with the pixels situated outside this triangle, for example pixels 202, 203, 220, 225 and others whose references do not appear in FIG. 2. According to a variant, the value associated with pixel 22 and copied to be associated with pixel 205 of the second block 200 is assigned to other pixels of the second block for which we seek to determine the value to be associated. According to the example of FIG. 2, the value of pixel 205 is propagated to the pixels belonging both to the column adjacent to the column of pixel 205 (inside the area delimited by pixels 201, 205, 226 and 230) and to the two rows nearest to the rows comprising pixel 205. This value is thus associated with pixels 204, 209, 210, 214 and 215. The rule or rules determining to which pixels of the second block 200 the value of pixel 205 must be assigned is (are) advantageously predetermined. One of the criteria for deciding to which pixels to assign the unknown value is the parity of the (horizontal and vertical) upsampling factor. In the case where the upsampling factor M or N is odd, the value of pixel 205 is propagated over half of the interpolated columns/rows, the number of columns/rows concerned being equal to (M−1)/2 or (N−1)/2. According to the example of FIG. 2, we have an odd vertical upsampling factor M as it is equal to 5. This means that there are 4 rows between the rows comprising pixels 201, 205 and 226, 230 whose associated value originates from the first block 20. The row comprising pixels 201 and 205 is for example numbered 0 and the row comprising pixels 226 and 230 is numbered 5. The two rows comprising pixels to which are assigned the value of pixel 205 are thus the rows numbered 1 and 2. The horizontal upsampling factor N being even (equal to 4 according to the example of FIG. 2), it is not possible to divide the number of columns of the second block 200 in two to obtain a whole number. For the pixels of the middle column (column numbered 2 comprising pixels 203 and 228, working on the principle that the column numbered 0 is the left-most column, that is to say the column comprising pixels 201 and 226), it is necessary to determine a priori which rule to apply to determine their associated values: either use the equation of the plane or copy the value associated with pixel 205. This means determining whether the pixels of the middle column must belong to the object or the plane including pixels 21, 23, 24 or to the object or the plane including pixel 22. Depending on the case, the two rules are meaningful. Advantageously, it is decided a priori which rule to apply, this rule being programmed and applied by default subsequently during the implementation of the interpolation method described herein. For example, for view synthesis purposes, the disparity value which corresponds to the depth furthest from the camera (from the viewpoint) will be copied and the number of pixels for which the disparity value is indeterminate will be limited. Conversely, for 3D reconstruction purposes, the pixels of the middle row and/or column will remain indeterminate, that is to say that the values associated with these pixels will remain unknown or indeterminate. In the example of FIG. 2, it was decided to use the equation of the plan passing through pixels 21, 23, 24 (or equivalently through pixels 201, 226 and 230) to determine the values to be associated with the pixels of column no. 2, for example pixels 203 and 208, some of these pixels being situated inside the triangle formed by the vertices 201, 226, 230 (that is to say the pixels of rows 3, 4 and 5), other pixels being situated outside this triangle (that is to say the pixels of rows 0, 1, 2). According to the example of FIG. 2, 6 pixels receive the value of pixel 22, that is to say that the value associated with pixel 22 is copied for the 6 pixels of the second block having column number 3 and 4 and row numbers 0, 1, 2. For the other pixels of the second block 200, their associated values are determined by using the equation of the plane passing through pixels 21, 23, 24 (or through pixels 201, 226, 230).

According to a variant, the equation of the plane is of parametric type and is determined from the coordinates ($x_{23}$, $y_{23}$, $z_{23}$) of a pixel denoted A (for example pixel 23) and two non-collinear vectors, for example a first vector $\vec{u}(u_1, u_2, u_3)$ defined from the pair of pixels 23, 21 and a second vector $\vec{v}(v_1, v_2, v_3)$ defined from the pair of pixels 23, 24. The plane being the set of points M(x, y, z) for which there exist two scalars λ and μ such that:

$\overrightarrow{OM} = \overrightarrow{OA} + \lambda \vec{u} + \mu \vec{v}$, corresponding to the vector equation of the plane $$\begin{cases} x = x_{23} + \lambda u_1 + \mu v_1 \\ y = y_{23} + \lambda u_2 + \mu v_2 \\ z = z_{23} + \lambda u_3 + \mu v_3 \end{cases}$$

corresponding to the parametric equations of the plane, λ and μ being the parameters of the plane, λ and μ being real values.

Figure 3:
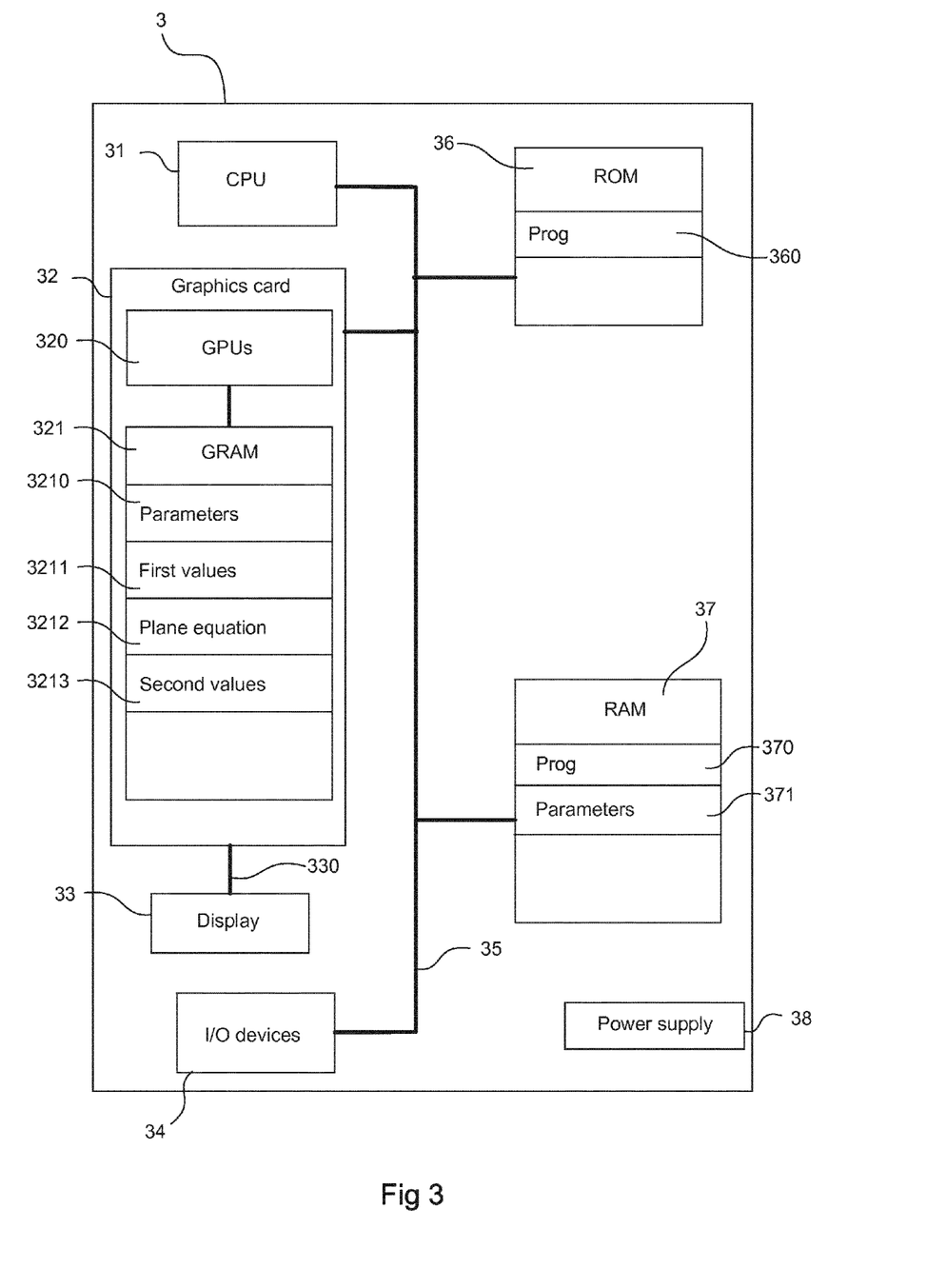
FIG. 3 diagrammatically shows a device implementing a method for interpolating a first pixel matrix of FIG. 1, according to a particular implementation of the invention.

FIG. 3 shows diagrammatically a hardware embodiment of a device 3 suitable for the interpolation of a first pixel matrix to a second pixel matrix. The device 3 corresponding for example to a personal computer, a laptop, a set-top box or an image processing module embedded in a display device.

The device 3 comprises the following elements, connected to each other by an address and data bus 35 which also transports a clock signal:
- a microprocessor 31 (or CPU);
- a graphics card 32 comprising:
  - several graphics processing units 320 (or CPUs);
  - a graphical random access memory (GRAM) 321;
- a non-volatile memory of ROM (Read Only Memory) type 36 comprising for example a program 360 of operating system type;
- a random access memory (RAM) 37;
- one or more I/O (Input/Output) devices 34 such as for example a keyboard, a mouse, a webcam; and
- a power supply 38.

The device 3 also comprises a display device 33 of display screen type directly connected to the graphics card 32 to display notably the rendering of images associated with the first pixel matrix or with the second pixel matrix. The use of a dedicated bus to connect the display device 33 to the graphics card 32 offers the advantage of having much greater data transmission bitrates and thus reducing the latency time for the display of images composed by the graphics card. According to a variant, an apparatus for displaying images is external to the device 3 and is connected to the device 3 by a cable transmitting the display signals. The device 3, for example the graphics card 32, comprises a means for transmission or connector (not shown in FIG. 3) suitable for transmitting a display signal to an external display means such as for example an LCD or plasma screen or a video projector.

It is noted that the word "register" used in the description of memories 321, 36 and 37 designates in each of the memories mentioned a memory zone of low capacity (some binary data) as well as a memory zone of large capacity (enabling storage of a whole program or all or part of the data representative of data calculated or to be displayed).

When switched on, the microprocessor 31 loads and executes the instructions of the program contained in the RAM 37.

The random access memory 37 notably comprises:
- in a register 370, the operating program of the microprocessor 31 responsible for switching on the device 3;
- parameters 371 representative of the pixels of the first matrix, for example the coordinates of the pixels or the first values associated with the pixels.

The algorithms implementing the steps of the method specific to the invention and described hereafter are stored in the memory GRAM 321 of the graphics card 32 associated with the device 3 implementing these steps. When switched on and once the parameters 371 representative of the first matrix are loaded into the RAM 37, the graphics processors 320 of the graphics card 32 load these parameters into the GRAM 321 and execute the instructions of these algorithms in the form of microprograms of "shader" type using HLSL ("High Level Shader Language") or GLSL ("OpenGL Shading Language") for example.

The random access memory GRAM 321 notably comprises:
- the parameters 3210 representative of the pixels of the first pixel matrix;
- first values 3211 associated with pixels of the first matrix;
- parameters 3212 representative of the equation of a plane passing through at least three pixels of the first matrix; and
- second values 3213 associated with the pixels of the second pixel matrix from the interpolation of the first pixel matrix.

According to a variant, the values and parameters 3210 to 3213 are stored in the RAM 37 and processed by the microprocessor 31.

According to another variant, a part of the RAM 37 is assigned by the CPU 31 for storage of the values and parameters 3210 to 3213 if the memory storage space available in the GRAM 321 is insufficient. This variant however causes greater latency time in the calculations necessary for the interpolation from microprograms contained in the GPUs as the data must be transmitted from the graphics card to the random access memory 37 via the bus 35 whose transmission capacities are generally lower than those available in the graphics card for transmission of data from the GPUs to the GRAM and vice-versa.

According to another variant, the power supply 38 is external to the device 3.

Figure 4:
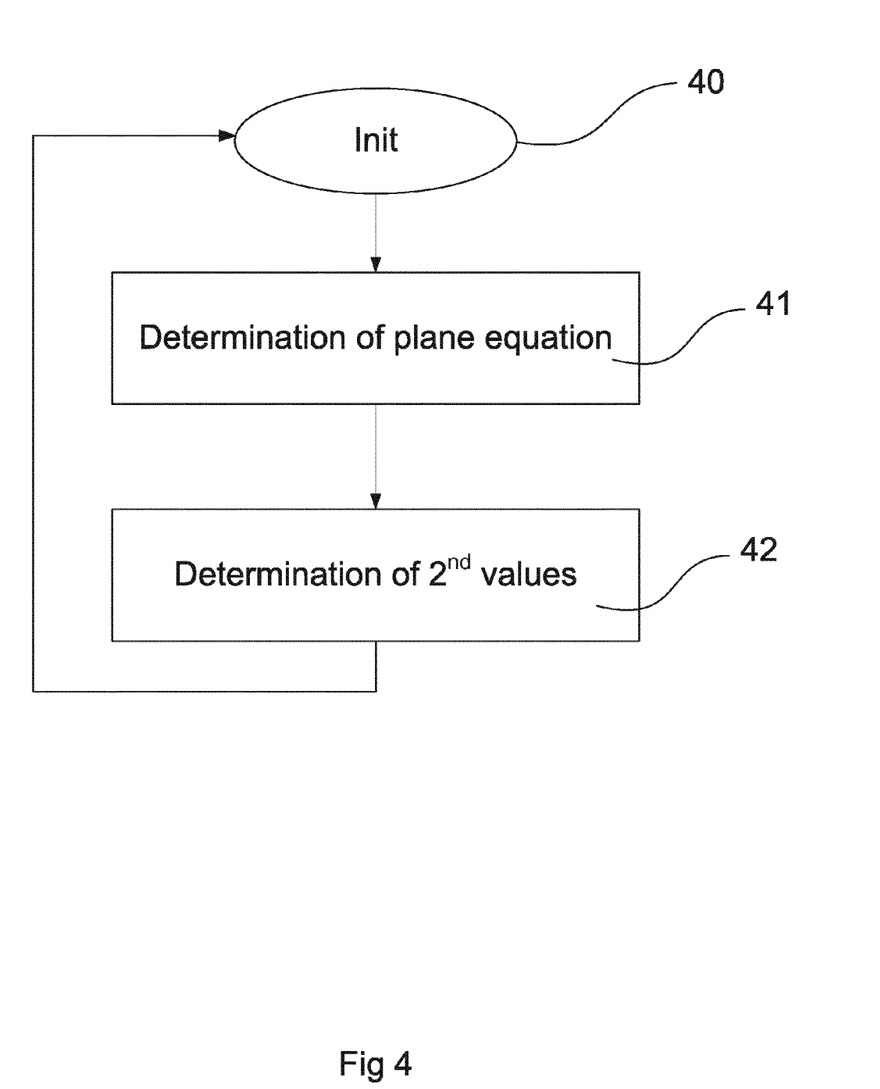
FIG. 4 shows a method for interpolating the first pixel matrix of FIG. 1, implemented in the device of FIG. 3, according to a particular embodiment of the invention.

FIG. 4 shows a method for interpolating a first pixel matrix to a second pixel matrix implemented in a device 3, according to a non-restrictive particularly advantageous embodiment of the invention.

During an initialisation step 40, the different parameters of the device 3 are updated.

Then, during a step 41, the equation of the plane passing through three pixels of the first pixel matrix is determined, the first values associated with these three pixels being known, either by direct measurement or by estimation for other values. The first values are for example received from sensors suitable for measuring them or determined from other values (for example, if the first values correspond to values representative of disparity, these first values can be determined from the grey levels associated with each pixel of two images representing a same scene according to two different viewpoints). The equation of the plane is determined from the coordinates of the three pixels in the first matrix and the first values associated with these pixels. According to a variant, the equation of the plane is determined from more than three pixels, for example 4 pixels, when the first values associated with these pixels are relatively uniform, that is to say when the variations between them are small, that is to say less than a threshold value, for example less than the threshold values described with regard to FIG. 2. This is notably the case when the 4 pixels used to determine the equation of the plane are associated with a same surface of an object of an image. The equation of the plane is for example of Cartesian type or of parametric type.

Advantageously, the second pixel matrix comprises a number of pixels greater than the number of pixels of the first matrix, the second matrix corresponding to an upsampling of the first matrix. The upsampling of the first matrix is obtained from a horizontal upsampling factor and a vertical upsampling factor. Advantageously, the horizontal upsampling factor is different from the vertical upsampling factor. According to a variant, the horizontal upsampling factor is equal to the vertical upsampling factor.

Advantageously, when the equation of the plane is determined from three pixels, the three pixels used are adjacent and distributed over two adjacent columns and two adjacent rows.

The first values are advantageously representative of disparity. According to a variant, the first values are representative of grey levels.

Then, during a step 42, second values to be associated with the interpolated pixels of the second pixel matrix are determined from the equation of the plane determined in the previous step and the coordinates of the interpolated pixels in the second matrix. The interpolated pixels of the second matrix correspond advantageously to the pixels of the second matrix surrounded by the pixels of the second matrix corresponding to the pixels of the first matrix. The values associated with the pixels of the second matrix corresponding to the pixels of the first matrix are equal to the first values associated with the pixels of the first matrix, these first values being copied in order to be associated with the corresponding pixels of the second matrix. In other words, the pixels of the first matrix are copied into the second matrix, only the coordinates being different between the first matrix and the second matrix for these pixels.

Advantageously, at least a portion of the interpolated pixels are positioned in the second matrix outside the polygon having as vertices the copies of the pixels of the first matrix in the second matrix. The polygon corresponds for example to a triangle when the pixels used to determine the equation of the plane are three in number and to a quadrilateral when the pixels used to determine the equation of the plane are four in number.

Advantageously, the first matrix comprises one or more pixels for which the associated first values are unknown or indeterminate. According to a variant, the first matrix comprises at least one pair of pixels having a difference between their associated first values greater than a predetermined threshold value.

According to a variant embodiment, the parity of the horizontal upsampling factor and the parity of the vertical upsampling factor are determined. According to the result of the determination of the parity, it is determined which interpolation rule must be applied to the interpolated pixels belonging to the middle column of the second matrix when the horizontal upsampling factors is even and to the interpolated pixels belonging to the middle row or the second matrix when the vertical upsampling factor is even. The choice of the rule to be applied is advantageously made from among a plurality of interpolation rules, for example from among the following two interpolation rules:

use of the equation of the plane to determine the second values to be associated with the interpolated pixels of the middle column and/or the middle row of the second pixel matrix;

copying of a first value associated with one of the pixels of the second matrix (corresponding to a copy of a pixel of the first matrix) to associate it with the interpolated pixels of the middle column and/or the middle row of the second pixel matrix.

The decision to use one or other of the rules for the interpolated pixels of the middle column and/or the middle row of the second pixel matrix when the horizontal and/or vertical upsampling factor is even corresponds to an arbitrary implementation choice and is determined beforehand.

Naturally, the invention is not limited to the embodiments previously described.

In particular, the invention is not limited to an interpolation method but extends to the processing unit implementing the interpolation method. The invention also relates to an image processing method implementing the upsampling of a source image in order to generate an upsampled image from the source image.

The embodiments previously described are for example implemented in a method or a process, an apparatus, a software program, a data stream or a signal. A device or apparatus implementing the interpolation method described is for example in the form of hardware components, programmable or not, in the form of one or more processors (advantageously of GPU type but also of CPU or ARM type according to variants). The methods described are implemented for example in an apparatus comprising at least one processor, which refers to processing devices in general, comprising for example a computer, a microprocessor, an integrated circuit or a programmable software device. Processors also comprise communication devices, such as for example computers, mobile or cellular telephones, smartphones, portable/personal digital assistants (PDAs), digital tablets or any other device enabling the communication of information between users.

The embodiments of the various processes and various characteristics described previously can be implemented in various equipment or applications, for example notably in an item of equipment or applications associated with the coding of data, the decoding of data, the generation of views or images, processing texture, and any other processing of images or information representative of texture and/or information representative of depth. Examples of such an item of equipment are an encoder, a decoder, a post-processor processing the outputs of a decoder, a preprocessor supplying inputs to an encoder, a video coder, a video decoder, a video codec, a web server, a set-top box, a laptop, a personal computer, a mobile telephone, a PDA, a digital tablet and any other communication device. The item of equipment can be mobile or on board a mobile vehicle.

Moreover, the methods described can be implemented in the form of instructions executed by one or more processors, and such instructions can be stored on a medium that can be read by a processor or computer, such as for example an integrated circuit, any storage device such as a hard disc, an optical disc (CD or DVD), a random access memory (RAM) or a non-volatile memory (ROM). The instructions form for example an application program stored in a processor-readable medium. The instructions take for example the form of hardware, firmware or software.

The invention claimed is:

1. A method of interpolating a first block of pixels to a second block of pixels, the second block having a number of pixels greater than the number of pixels of the first block, the second block corresponding to an upsampling of the first block by using a horizontal upsampling factor and a vertical upsampling factor, the first block of pixels having four pixels arranged in two adjacent rows and two adjacent columns, first values being associated with said pixels of the first block, the first values being determinate for three of the four pixels and indeterminate for one of the four pixels, the method comprising:

determining a parity of said horizontal and vertical upsampling factors;

determining second values to be associated with at least a part of interpolated pixels of the second block from coordinates of said three pixels of the first block having associated determinate first values, from first values associated with said three pixels and from coordinates of interpolated pixels in the second block, and determining an interpolation rule to be applied to the interpolated pixels belonging to the middle column of the second block when the horizontal upsampling factor is even and/or to be applied to the interpolated pixels belonging to the middle row of the second block when the vertical upsampling factor is even.

2. The method according to claim 1, further comprising determining an equation of a plane passing through said three pixels of the first block having associated determinate first values from the coordinates of said three pixels in the first block and the first values associated with said three pixels, the second values to be associated with said at least a part of the interpolated pixels being determined from said equation of the plane and the coordinates of the interpolated pixels in the second block.

3. The method according to claim 1, wherein at least a part of the determined second values are associated with interpolated pixels positioned outside a polygon having as vertices said three pixels of the first block copied into the second block.

4. The method according to claim 1, wherein said indeterminate first value is associated with at least one pixel of the second block.

5. The method according to claim 4, wherein the number of pixels of the second block with which are associated the indeterminate first value is a function of parity of at least one of the horizontal and vertical upsampling factors used to obtain the second block of pixels by interpolation of the first block of pixels.

6. The method according to claim 1, wherein the interpolation rule is chosen from among a set of rules comprising the following rules:

association of second values with said pixels of the middle column and/or the middle row determined from an equation of a plane passing through said three pixels of the first block having associated determinate first values;

association of second values with said pixels of the middle column and/or the middle row corresponding to at least one first value associated with at least one pixel of the first block.

7. The method according to claim 1, wherein said first values are values representative of disparity.

8. The method according to claim 1, wherein said first values are values representative of grey level.

9. A non-transitory processor readable medium having stored therein instructions for causing a processor to perform at least the steps of the method according to claim 1.

10. A device for interpolating a first block of pixels to a second block of pixels the second block having a number of pixels greater than the number of pixels of the first block, the second block corresponding to an upsampling of the first block by using a horizontal upsampling factor and a vertical upsampling factor, wherein the first block of pixels having four pixels arranged in two adjacent rows and two adjacent columns, first values being associated with said pixels of the first block, the first values being determined for three of the four pixels and indeterminate for one of the four pixels, the device comprising at least one processor configured for:

determining a parity of said horizontal and vertical upsampling factors; and determining second values to be associated with at least a part of interpolated pixels of the second block from coordinates of said three pixels of the first block having associated determinate first values, from first values associated with said three pixels and from coordinates of interpolated pixels in the second block, and determining an interpolation rule to be applied to the interpolated pixels belonging to the middle column of the second block when the horizontal upsampling factor is even and/or to be applied to the interpolated pixels belonging to the middle row of the second block when the vertical upsampling factor is even.

11. The device according to claim 10, wherein said at least one processor is a graphics processing unit.

12. The device according to claim 10, wherein said at least one processor is further configured for determining an equation of a plane passing through said three pixels of the first block having associated determinate first values from the coordinates of said three pixels in the first block and the first values associated with said three pixels, the second values to be associated with said at least a part of the interpolated pixels being determined from said equation of the plane and the coordinates of the interpolated pixels in the second block.

13. The device according to claim 10, wherein at least a part of the determined second values are associated with interpolated pixels positioned outside a polygon having as vertices said three pixels of the first block copied into the second block.

14. The device according to claim 10, wherein said indeterminate first value is associated with at least one pixel of the second block.

15. The device according to claim 14, wherein the number of pixels of the second block with which are associated the indeterminate first value is a function of parity of at least one of the horizontal and vertical upsampling factors used to obtain the second block of pixels by interpolation of the first block of pixels.

16. The device according to claim 10, wherein the interpolation rule is chosen from among a set of rules comprising the following rules:

association of second values with said pixels of the middle column and/or the middle row determined from an equation of a plane passing through said three pixels of the first block having associated determinate first values;

association of second values with said pixels of the middle column and/or the middle row corresponding to at least one first value associated with at least one pixel of the first block.

17. The device according to claim 10, wherein said first values are values representative of disparity.

18. The device according to claim 10, wherein said first values are values representative of grey level.

\* \* \* \* \*